United States Patent
Schroeder et al.

(10) Patent No.: US 9,345,194 B2
(45) Date of Patent: May 24, 2016

(54) AUTOMATIC DISPLAY OF REMOTE CAMERA IMAGE

(75) Inventors: Jay David Schroeder, Coal Valley, IL (US); Daniel Lynn Renaud, Shawnee, KS (US); John Michael King, Lakeville, MN (US); Kevin Douglas McKee, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 1338 days.

(21) Appl. No.: 12/570,643

(22) Filed: Sep. 30, 2009

(65) Prior Publication Data

US 2011/0072773 A1 Mar. 31, 2011

(51) Int. Cl.
*A01D 41/127* (2006.01)
*A01F 12/00* (2006.01)
*H04N 7/18* (2006.01)

(52) U.S. Cl.
CPC .................................. *A01D 41/127* (2013.01)

(58) Field of Classification Search
USPC ........... 701/50; 348/118, 120, 148; 56/10.2 R
See application file for complete search history.

(56) References Cited

U.S. PATENT DOCUMENTS

| | | | |
|---|---|---|---|
| 4,075,823 A | 2/1978 | Rowland-Hill | |
| 4,150,525 A | 4/1979 | De Busscher et al. | |
| 4,270,550 A | 6/1981 | daSilva | |
| 4,288,814 A * | 9/1981 | Talley et al. | 348/120 |
| 4,305,407 A | 12/1981 | De Coene | |
| 4,487,002 A * | 12/1984 | Kruse et al. | 460/6 |
| 4,497,162 A | 2/1985 | Eguchi et al. | |
| 4,527,241 A * | 7/1985 | Sheehan et al. | 701/50 |
| 4,555,725 A * | 11/1985 | Geiersbach et al. | 348/120 |
| 4,816,828 A | 3/1989 | Feher | |
| 5,680,123 A | 10/1997 | Lee | |
| 5,793,420 A | 8/1998 | Schmidt | |
| 5,874,989 A | 2/1999 | O'Brien et al. | |
| 5,978,720 A | 11/1999 | Hieronymus et al. | |
| 5,995,895 A * | 11/1999 | Watt et al. | 701/50 |
| 6,119,442 A | 9/2000 | Hale | |
| 6,726,559 B2 * | 4/2004 | Bischoff | 460/1 |
| 6,758,745 B2 | 7/2004 | Van Der Haegen et al. | |
| 6,940,423 B2 * | 9/2005 | Takagi et al. | 340/932.2 |
| 7,230,523 B2 | 6/2007 | Harter, Jr. et al. | |
| 7,245,207 B1 * | 7/2007 | Dayan et al. | 340/435 |
| 7,342,486 B2 * | 3/2008 | Tsukada et al. | 340/438 |

(Continued)

OTHER PUBLICATIONS

*ExplainThatStuff!* "Combine Harvesters"; May 6, 2009; 5 pages.

*Primary Examiner* — John Q Nguyen
*Assistant Examiner* — Kyung Kim
(74) *Attorney, Agent, or Firm* — Patrick M. Sheldrake

(57) ABSTRACT

A farm vehicle includes a crop gathering mechanism to convey harvested crop material to a crop flow path passing internally through at least part of the vehicle. The vehicle includes a vehicle data bus and a plurality of control modules operatively connected to the vehicle data bus and configured to monitor information on the vehicle data bus and to act according to such information. An electronic operator module is configured to monitor the states of operator controls and to broadcast information on the vehicle data bus specifying such states. Additionally, video cameras positioned within the vehicle face the crop flow path and are operably connected to a graphic display. A graphic display control module includes a processor configured to control the display of images on the graphic display for selective display of images from the video cameras based upon information from the vehicle data bus.

9 Claims, 4 Drawing Sheets

(56) References Cited

U.S. PATENT DOCUMENTS

| | | | |
|---|---|---|---|
| 7,877,969 B2* | 2/2011 | Behnke | 56/10.2 R |
| 8,045,168 B2 | 10/2011 | Missotten et al. | |
| 2002/0082757 A1* | 6/2002 | Behnke | 701/50 |
| 2003/0014171 A1* | 1/2003 | Ma et al. | 701/50 |
| 2003/0174207 A1* | 9/2003 | Alexia et al. | 348/89 |
| 2003/0222982 A1* | 12/2003 | Hamdan et al. | 348/148 |
| 2004/0119822 A1* | 6/2004 | Custer et al. | 348/148 |
| 2005/0174429 A1 | 8/2005 | Yanai | |
| 2006/0191251 A1* | 8/2006 | Pirro et al. | 56/60 |
| 2006/0213167 A1* | 9/2006 | Koselka et al. | 56/10.2 A |
| 2006/0271262 A1* | 11/2006 | McLain | 701/50 |
| 2007/0056258 A1* | 3/2007 | Behnke | 56/10.2 R |
| 2007/0299591 A1* | 12/2007 | Goering et al. | 701/50 |
| 2008/0122597 A1 | 5/2008 | Englander | |
| 2009/0044505 A1* | 2/2009 | Huster et al. | 56/10.2 R |
| 2009/0125197 A1* | 5/2009 | Behnke | 701/50 |

* cited by examiner

AUTOMATIC DISPLAY OF REMOTE CAMERA IMAGE

BACKGROUND OF THE INVENTION

As combine harvesters ("combines") become larger and more complicated, it becomes more difficult for the combine operator to maintain visual contact with functions of the harvesting process and logistics of operating and maneuvering the combine harvester. To that end, remote mounted video cameras may be utilized on combine harvesters to allow the operator to 'see' critical functions. For example, the images may be displayed on a dedicated video monitor in the combine cab and the vehicle control monitor can have the ability to show video output if the operator manually selects to view the desired video footage.

Some of the functions that may be viewed via a remote mounted video camera are the unloading process, and backing up of the combine while driving the combine in reverse. A camera mounted either to the end of the unloading tube directed into the receiving receptacle or cameras mounted at the rear of the combine used to view the combine surroundings for safe reverse movement of the combine may be utilized. However, this requires the combine operator to determine which images to see and to select them, all the while operating an increasingly complicated machine.

U.S. Pat. No. 6,758,745, issued on Jul. 6, 2004, and titled Tool and Method for Removal and Installation of Threshing Concave, is incorporated by reference herein in its entirety. U.S. Pat. No. 5,978,720, issued on Nov. 2, 1999, and titled Agricultural Machine, Especially Combine Harvester, with Multiprocessor Guide System, is incorporated by reference herein in its entirety.

BRIEF SUMMARY OF THE INVENTION

In one aspect of the present invention, a farm vehicle comprises a frame, a crop gathering mechanism mounted on an end portion of the frame to convey harvested crop material to a crop flow path passing internally through at least part of the vehicle, and a vehicle data bus. The farm vehicle also comprises a plurality of control modules operatively connected to the vehicle data bus and configured to monitor information on the vehicle data bus and to act according to the information on the vehicle data bus. At least one of the plurality of control modules constitutes a graphic display control module. The farm vehicle includes a plurality of operator controls and an electronic operator module configured to monitor the states of the operator controls and to broadcast information on the vehicle data bus specifying the states of the operator controls. Additionally, multiple video cameras are provided on the vehicle including one or more video cameras positioned within the vehicle to face the crop flow path, and are operably connected to a graphic display. The graphic display control module includes a processor configured to control the display of images on the graphic display for the selective display of images on the graphic display from one or more of the video cameras based upon information from the vehicle data bus.

In another aspect of the present invention, a method of operating the farm vehicle includes conveying harvested crop material to the crop flow path passing internally through at least part of the vehicle with the crop gathering mechanism mounted on the end portion of the frame. Also, the control modules operatively connected to the vehicle data bus monitor information on the vehicle data bus and act according to the information on the vehicle data bus. The electronic operator module monitors the states of the operator controls and broadcasts information on the vehicle data bus specifying the states of the operator controls. The processor selects images for display by the graphic display from the multiple video cameras based upon information from the vehicle data bus.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the Drawings.

DETAILED DESCRIPTION OF THE INVENTION

It is the intent of this invention to minimize the operator intervention required to view critical machine operations of the farm vehicle on the vehicle control display to, for example, allow the operator to maintain focus on operating the vehicle. This intent is achieved by automatic display of images based upon the functions being carried out by the vehicle. Additionally, the present invention provides the operator the capability to view inside the farm vehicle to determine the effects of critical machine operations.

Figure 1:
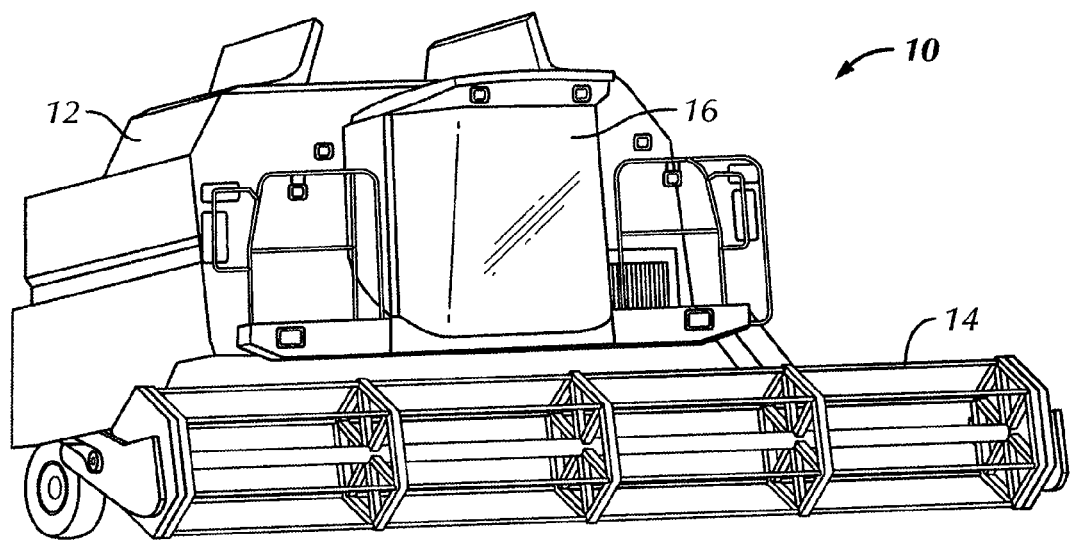
FIG. 1 shows a combine harvester.
Figure 2:
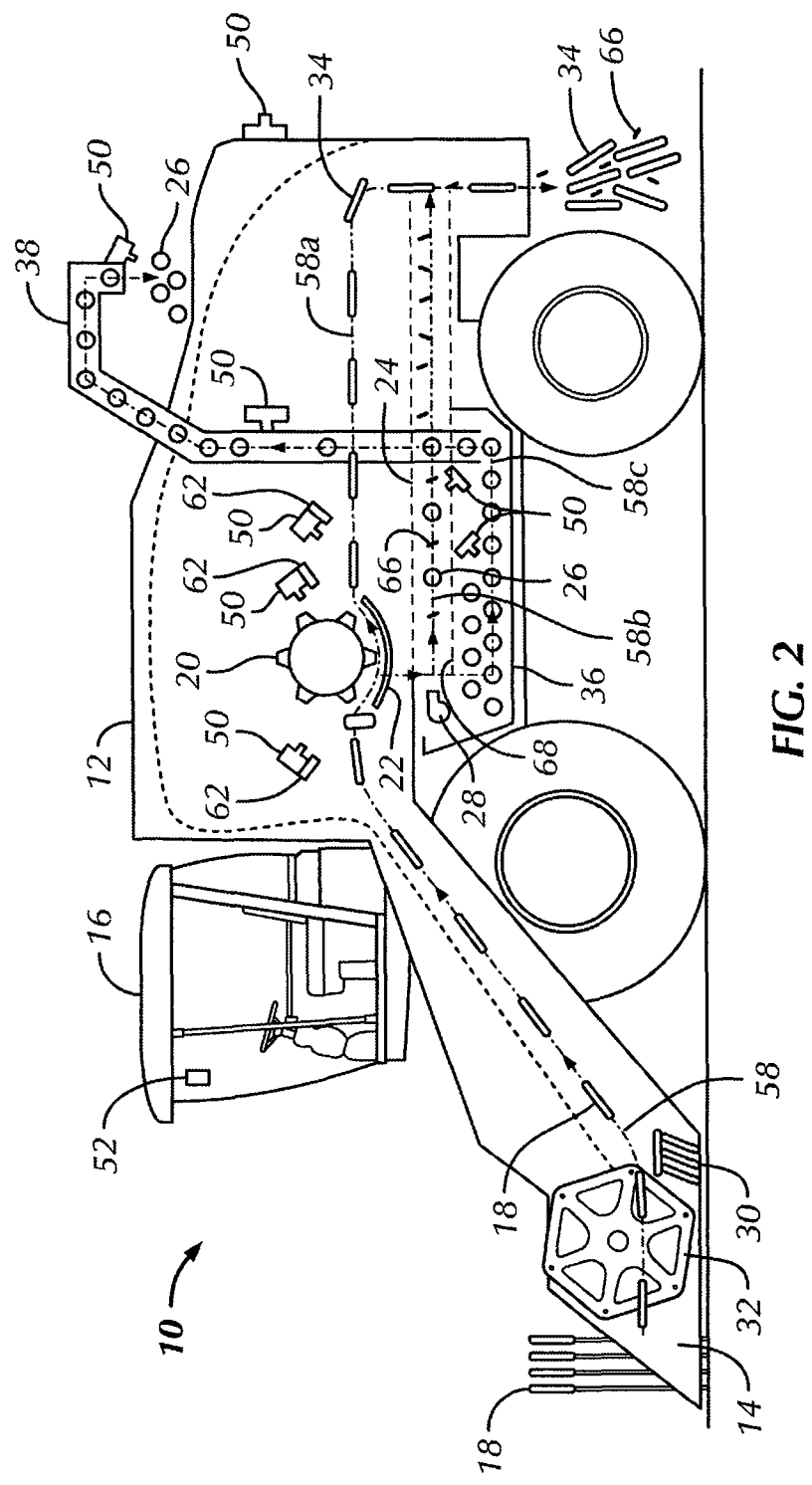
FIG. 2 is a simplified schematic of a combine harvester according to the present invention.

Referring to FIGS. 1 and 2, a farm vehicle 10 according to the present invention can be a combine harvester farm vehicle 10. The present invention would also work with tractors, grape harvesters, sugar cane harvesters, forage harvesters, cotton pickers, sprayers, etc. The combine harvester farm vehicle 10 includes a frame 12 and a crop gathering mechanism 14 mounted on an end portion of the frame 12 to convey harvested crop material 18 to a crop flow path 58 passing internally through at least part of the farm vehicle 10. The farm vehicle 10 also includes a cab 16. The farm vehicle 10 preferably includes a threshing and cleaning assembly defining part of the internal crop flow path 58 to separate grain material 26 from the harvested crop material 18. The threshing and cleaning assembly includes a threshing cylinder 20 rotatably supported from the frame 12, a threshing concave 22 positioned proximate to the threshing cylinder 20 to operably interact with the threshing cylinder 20 to effect threshing, one or more sieves 24, 68, and a fan 28. Depending on the design of the particular farm vehicle 10, it is possible to have more than one threshing cylinder 20, threshing concave 22, and fan 28 or other operating components that would require the attention of the vehicle operator.

During operation, the crop gathering mechanism 14 (e.g., a header), will gather crop material 18 such as grain crops, including wheat. The crop material 18 will then be pushed toward the cutter 30 by the reel 32, where it is cut. The crop material 18 which has been cut is then transported along a crop flow path 58 passing internally through at least part of the vehicle 10 including the threshing cylinder 20 where it is threshed between the threshing cylinder 20 and the threshing concave 22. It is at this point that the grain material 26 is at least partially separated from stalks 34 of the crop material 18. Sieves 24 initially separate the grain material 26 from the stalks 34 of the crop material 18. Additionally, the fan 28 will also help separate the grain material 26 by blowing away chaff 66, including small stalk pieces, passing through sieves 24. Sieves 68 also help further separate the grain material 26 from the chaff 66. After separation, the grain material 26 collects in a tank 36. The stalks 34 and chaff 66 are transported outside of the farm vehicle 10. Preferably when the tank 36 is full, an unloading tube 38 unloads the grain material 26 to, for example, a trailer (not shown).

After passing through the threshing cylinder 20 and threshing concave 22, the crop flow path 58 splits into paths 58a, 58b, and 58c, as shown in FIG. 2. Path 58a contains stalks 34 which are ejected from the farm vehicle 10 after the crop material 18 is threshed and sieved by sieves 24. Path 58b contains grain material 26 plus chaff 66. Fan 28 aides in the separation of the grain material 26 from the chaff 66 in path 58b by blowing the chaff 66 away from the denser grain material 26. Additionally, a second set of sieves 68 help separate the grain material 26 from the chaff 66 in path 58b, with the grain material 26 falling through sieves 68 while the remainder of path portion 58b carries the chaff 66 to path portion 58a, where the chaff 66 is ejected with the stalks 34 out of the farm vehicle 10. Path 58c contains cleaned and separated grain material 26, which ends at the outlet of unloading tube 38 where the grain material 26 is unloaded onto, for example, a trailer. It should be understood that the specific arrangement of the combine harvester farm vehicle 10 disclosed above is not limiting, and that any combine harvester farm vehicle 10 with any arrangement is within the spirit and scope of the present invention.

Figure 3:
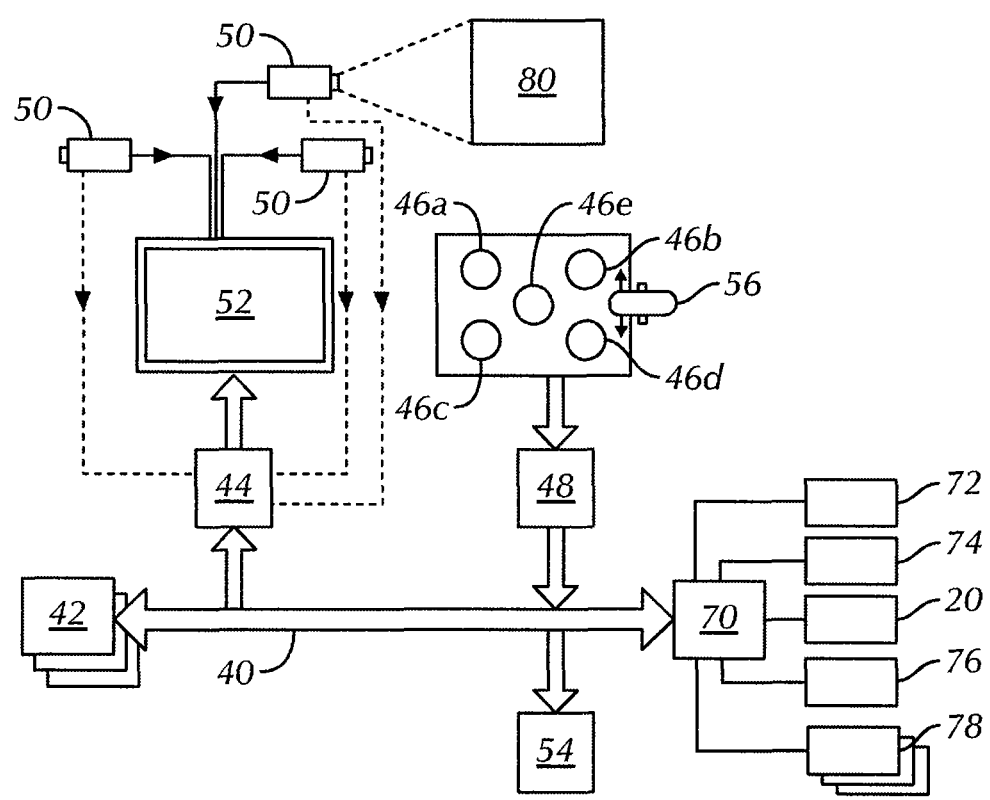
FIG. 3 is a schematic of a communications network of a combine harvester according to an embodiment of the present invention.

Referring to FIGS. 2, and 3, the farm vehicle 10 includes a vehicle data bus 40 configured to transmit information within the farm vehicle 10 and is also known in the art as a vehicle bus. Essentially, the vehicle data bus 40 is an internal communications network that interconnects components inside a vehicle. The protocol for the vehicle data bus 40 is preferably a controller-area network, which is a vehicle bus standard designed to allow microcontrollers and devices to communicate with each other within a vehicle without a master controller. Other communications networks and other protocols can be utilized and are well known in the art.

A plurality of control modules 42 are operatively connected to the vehicle data bus 40 to transmit and/or receive information. Preferably, the plurality of control modules 42 includes a graphic display control module 44, an engine control module 54, and a chassis control module 70. The graphic display control module 44 is part of or at least operably connected with a graphic display 52, to control the images shown on the display 52. The engine control module 54 is configured to broadcast information related to engine performance including but not limited to engine speed (RPM), fuel rate, engine torque, etc. to the vehicle data bus 40. The graphic display control module 44 is configured to identify and display such information as one or more bar graphs on the graphic display 52 or in other electronic display formats such as numerical formats. Additionally, actual graphical field maps of yield, moisture, chemical application, vehicle position, etc. can be shown. Graphic icons to indicate operational states of the vehicle may also be displayed. Text information can also be presented. Control modules 42 or other devices preferably can broadcast vehicle information (e.g., at least one selected from the group consisting of: engine speed, fuel level, rotor speed, sieve opening, ground speed, etc.) to the vehicle data bus 40. This vehicle information can then be displayed on the graphic display 52 based on the vehicle information.

The chassis control module 70 may be connected to an unloader auger 72 which transports grain material 26 to the unloading tube 38, an external light source 74, the threshing cylinder 20, a ground drive 76, which controls the speed and direction of the farm vehicle 10, and other functions 78.

At least a plurality of the control modules 42 are configured to act according to the information on the vehicle data bus 40. In particular, one or more control modules 42 are configured to control at least one function selected from the group consisting of: a rotor speed for the threshing cylinder 20, a fan speed, a sieve opening size, a threshing concave clearance, the direction of travel of the farm vehicle 10, and the operation of the unloader auger 72 based upon the information from the vehicle data bus 40. Such control module or modules 42 can also be configured to monitor the information on the vehicle data bus 40 to determine whether any of the rotor speed for the threshing cylinder 20, the fan speed, the sieve opening size, the threshing concave clearance, the direction of travel of the combine, and/or operation of the unloader auger 72 are to be modified and act appropriately to make such modifications.

The rotor speed for the threshing cylinder 20 is the speed of rotation of the threshing cylinder 20 as it threshes the crop material 18. The fan speed is a speed of the fan 28, which will affect the separation of the stalks 34 from the grain material 26. The sieve opening size is the size of openings of the sieves 24, 68 through which the grain material 26 falls to separate from the stalks 34 (although the separation may not be complete, requiring the use of a fan 28). The mechanism for changing the size of openings of the sieves 24, 68 is known in the relevant art and a specific explanation of such mechanism is not necessary for an understanding of the present invention. A threshing concave clearance is the clearance (i.e., separation) between the threshing cylinder 20 and the threshing concave 22. Adjustments to the rotor speed, concave clearance, fan speed and/or sieve opening are typically performed to improve cleanliness of the grain sample, reduce loss, etc.

The farm vehicle 10 comprises a plurality of operator controls 46. The operator controls 46 include at least one control selected from the group consisting of: a rotor speed control 46a, a threshing concave clearance control 46b, a fan speed control 46c, and a sieve opening control 46d. The operator controls 46 are preferably located in the cab 16 of the farm vehicle 10 in order to be easily accessible to the operator of the farm vehicle 10. However, any location for the operator controls 46 is possible. Other potential operator controls 46 that may be included are a propulsion handle 56, which can be used to control the direction of movement to forward or reverse, and for a combine harvester farm vehicle 10, an unloader auger control 46e, which controls the unloading of the grain material 26 out of the unloading tube 38 by feeding the unloading tube 38 with the unloader auger 72. While a single "button" is depicted for each operator control 46, it will be appreciated that the controls can have any of a variety of forms, e.g. a joy stick or toggle, to permit two way operator adjustment.

The farm vehicle 10 also includes an electronic operator module 48 operably connected to the operator controls 46 and the vehicle data bus 40. The electronic operator module 48 is configured to monitor the states of the operator controls 46 and to broadcast information on the vehicle data bus 40 specifying the states of the operator controls 46. For example, the electronic operator module 48 may be configured to detect and broadcast information on the vehicle data bus 40 indicative of a change of state of at least one operator control 46 selected from the group consisting of: a rotor speed control 46*a*, a threshing concave clearance control 46*b*, a fan speed control 46*c*, and a sieve opening control 46*d*. The change of state of the propulsion handle 56 and/or the unloader auger control 46*e* can also be monitored and relevant information broadcast on the vehicle data bus 40.

The farm vehicle 10 also has multiple video cameras 50 including, according to a preferred embodiment of the invention, one or more video cameras 50 positioned within the farm vehicle 10 to face the crop flow path 58. Conventionally, it is not until the grain material 26 can finally be viewed as it is unloaded by the unloading tube 38, that the results of fine system adjustments are visible to the operator. By placing video cameras 50 inside the farm vehicle 10 to face the crop flow path 58, earlier visual feedback can be provided to the operator.

Preferably, at least one camera 50 faces grain material 26 which has been at least partially separated from the harvested crop material 18. For example, video cameras 50 can face the tank 36, one or more sieves 24, 68, the threshing cylinder 20 and/or the threshing concave 22. Additionally, video cameras 50 can be included which are not inside the farm vehicle 10, such as a rear video camera 50 facing away from a back portion of the farm vehicle 10 and a video camera 50 facing the end of the unloading tube 38. More than one video camera 50 can face the same place (to obtain different angle views). Also, the orientation and/or position of the video cameras 50 may be made adjustable by the operator, so that the operator can change the orientation and/or position of the video cameras 50 before and/or during their use. For example, the video cameras 50 may be movable by the operator from the cab 16 and may even include zoom capabilities controlled from the cab 16 to provide more breadth of visual options for the operator.

Since the crop flow path 58 is inside the farm vehicle 10, it will not be in direct contact with sunlight. Internal light sources 62 are utilized to help the video cameras 50 capture images of the crop flow path 58, the crop material 18, the grain material 26, and other desired locations 80, without the need for sunlight. Thus, the farm vehicle 10 includes one or more internal light sources 62 positioned to provide illumination to at least a portion of the crop flow path 58 to permit visual detection of the grain material 26 by one or more of the video cameras 50. It is preferable for respective video cameras 50 to face the crop material 18 and the grain material 26 at different stages of threshing, cleaning, and unloading.

Light sources 62 are provided and positioned to help the video cameras 50 obtain the best images and may be positioned on the video cameras 50 themselves. One or more light sources 62 can be used in combination to improve the visibility inside a particular portion of the crop flow path 58 of the farm vehicle 10 so that the video cameras 50 can capture appropriate images. The light sources 62 can constitute electric lighting, such as incandescent bulbs, fluorescent bulbs, light emitting diodes, etc., but any type of lighting is within the spirit and scope of the present invention.

The light sources 62 may be on continuously, for a predetermined length of time, or for a variable length of time which corresponds to the image display. If the light sources 62 are on continuously, the light sources 62 are on whenever the farm vehicle 10 itself is on. If the light sources 62 are on for a predetermined length of time, the activation of the cameras 50 or the display of camera images on the graphic display 52 will trigger the one or more light sources 62 to turn on for a set time, such as 30 seconds. The farm vehicle 10 preferably has a default setting for this set time which is adjustable by the operator to increase or decrease the amount of time the light sources 62 are on. If the light sources 62 are on for a for a variable length of time which corresponds to the image display, the activation of the cameras 50 or the display of camera images on the graphic display 52 will trigger the light sources 62 to turn on until the cameras 50 are deactivated or the display of camera images on the graphic display 52 are ceased. All the light sources 62 may be turned on or select light sources 62 may be turned on, based on which camera images are being displayed. While it is possible to keep the light sources 62 on all of the time, it is preferable to turn them on only when needed.

Alternatively, the trigger for turning on light sources 62 may be an adjustment to a functional system which will affect the threshing and/or cleaning of the crop material 18 (e.g., rotor speed, concave clearance, fan speed, and/or sieve opening). Thus, a light source 62 may automatically turn on (if not on already) in order to enable the camera(s) 50 to obtain images. Preferably, one or more of the control modules 42 are configured to control the activation of the light sources 62, in response to information from the vehicle data bus 40 indicative of the change of state of the at least one operator control 46 selected from the group consisting of: the rotor speed control 46*a*, the threshing concave clearance control 46*b*, the fan speed control 46*c*, and the sieve opening control 46*d*. Such activation may be for a duration which is adjustable by the operator.

As shown in FIG. 3, the video cameras 50 are operably connected to video inputs of the graphic display 52 which is preferably visually accessible to the operator in the cab 16. Preferably, the video cameras 50 are directly connected to the graphic display 52 to communicate directly with the graphic display 52. The standards used for the communication can be NTSC or Phase Alternating Line (PAL) Standards or other standards known in the art. The video cameras 50 can, instead, or in addition to, be operably connected to the graphic display control module 44, as shown in phantom in FIG. 3. The direct connection of the video cameras 50 to the graphic display 52 is intended to provide a flow of data from the video cameras 50 to the graphic display 52 for display of images on the graphic display 52. The connection of the video cameras 50 to the graphic display control module 44 can serve two purposes. First, the graphic display control module 44 can select a particular camera or cameras for display of images on the graphic display 52. Second, such connection can be configured such that the graphic display control module 44 can control the activation of the video cameras 50 (and light sources 62) if they are not always on. Thus, information from the vehicle data bus 40 can be used by the graphic display control module 44 to turn on one or more of the video cameras 50.

The video cameras 50 along the crop flow path may be operated continuously, or for a length of time. The video cameras 50 can be on continuously whenever the farm vehicle 10 itself is on or at least in operation (i.e. harvesting grain). If the video cameras 50 are not on continuously, they can be operably connected to the graphic display control module 44 and the graphic display module 44 can be configured to respond to signals on the vehicle data bus 40, to activate one or more video cameras 50 along the crop flow path. The graphic display module 44 preferably has a default setting for a set time, such as 30 seconds, which can be made adjustable by the operator increase or decrease the amount of time. All or select one(s) of the crop flow path video cameras 50 may be turned on, based on which camera images are to be displayed.

There are at least two ways to control which images are displayed on the graphic display 52. One way is to control the activation of the video cameras 50. Thus, if a particular video camera 50 is activated (and the other video cameras 50 are not activated), then the image from the activated video camera 50 will be displayed on the graphic display 52. A second way is to have multiple cameras activated simultaneously (usually all of the video cameras 50), but to control which images are displayed on or fed to the graphic display 52. The information from the vehicle data bus 40 will provide the needed information to the graphic display control module 44 to either activate particular video camera(s) 50, or, preferably, to select images from particular activated video cameras 50 for display by the graphic display 52.

The graphic display control module 44 preferably includes a processor 60 configured to control images shown on the graphic display 52 based upon information from the vehicle data bus 40. In particular, the processor 60 is configured to at least select appropriate cameras 50 for activation or appropriate images from activated video cameras 50 for display of images from cameras 50 facing the crop flow path 58, automatically in response to information from the vehicle data bus 40 indicative of the change of state of the at least one operator control 46 selected from the group consisting of: the rotor speed control 46a, the threshing concave clearance control 46b, the fan speed control 46c, and the sieve opening control 46d.

The graphic display control module 44 is shown at FIG. 3 as a separate device from the graphic display 52. However, the graphic display control module 44 can be a component part of the graphic display 52. Similarly, the processor 60 can be part of the graphic display 52 or its functions split between separate processors in the graphic display 52 and graphic display control module 44. Thus, the graphic display control module 44 and/or the processor 60 can be separate but operably connected to the graphic display 52, or they can be part of the graphic display 52.

If an image is shown on the graphic display 52, it can remain on the graphic display 52 until a new image is sent to the graphic display 52 or for a certain period of time preferably set by the operator. If the image is to remain for a set period of time, and more time is needed, the operator can have access to a button or other control to request that the last image from a video camera 50 be displayed once again. Additionally, the software that runs the processor 60 can be programmed to provide more than one image at the graphic display 52, such as through a split screen.

The processor 60 can also be configured to prioritize, select, and exclude video cameras 50 for activation, or the images from activated video cameras 50 for display by the graphic display 52 based upon a predetermined command. For example, if an operator is or is not interested in viewing the grain material 26 proximate to the sieves 24, such situation can be programmed by the operator and the processor 60 would automatically select or exclude certain camera activation or image selection for display. The operator can program which video cameras 50 or images will be selected under particular operating conditions.

The graphic display 52 is configured to display information from the vehicle data bus 40, and software can control which information is displayed and in which format. Such software can be run in the processor 60. Preferably, when a video image from one or more of the cameras 50 is shown in the graphic display 52, it only occupies part of the screen of the graphic display 52 so that other functions of the graphic display 52 are not disturbed. For example, if the farm vehicle 10 is equipped with a video camera 50 which faces the unloading tube 38, whenever the unloading tube 38 is activated, the output of such video camera could be automatically displayed on the graphic display 52. This image could encompass the entire graphic display 52, or, preferably, only a portion of the graphic display 52. Similarly, if the farm vehicle 10 is equipped with a rear video camera 50, the output from the rear video camera 50 would be displayed on the graphic display 52 any time the propulsion handle 56 is pulled into reverse, thus allowing the operator to see the surrounding area behind the combine farm vehicle 10 automatically. However, such image will preferably only encompass a portion of the screen of the graphic display 52 in order to permit other information to be displayed on the graphic display. Additionally, as set by default in the system or as chosen by the operator, the display of images on the graphic display 52 can be of a single image from a single camera 50, or it can be from two or more cameras 50 where the graphic display 52 displays different images at different portions of the graphic display 52, such as by splitting the screen of the graphic display 52.

The processor 60 is preferably programmed to arbitrate simultaneous requests for selection of video cameras 50 or images to effectuate image display on the graphic display 52. The farm vehicle 10 can have an automatic default camera/image selection procedure in these cases but may be overriden by new programming or commands by the operator. For example, if the farm vehicle 10 is in reverse and the unloader auger 72 is on, the selection of the rear video camera 50 or its images may override the selection of the camera 50 facing the unloading tube 38 or its images, either as a default setting or as set by the operator. Thus, to the extent that a choice has to be made between cameras/images, the processor 60 can choose the correct camera/image to utilize for display. More than one rear video camera 50 may be on the rear of the farm vehicle 10, and the operator can program the graphic display 52 or processor 60 to choose which rear video camera or cameras 50 are displayed when the farm vehicle 10 is going in reverse. Similarly images from a rear video camera 50 would override any images from along the crop flow path 58 when the farm vehicle 10 is being backed up.

Figure 4:
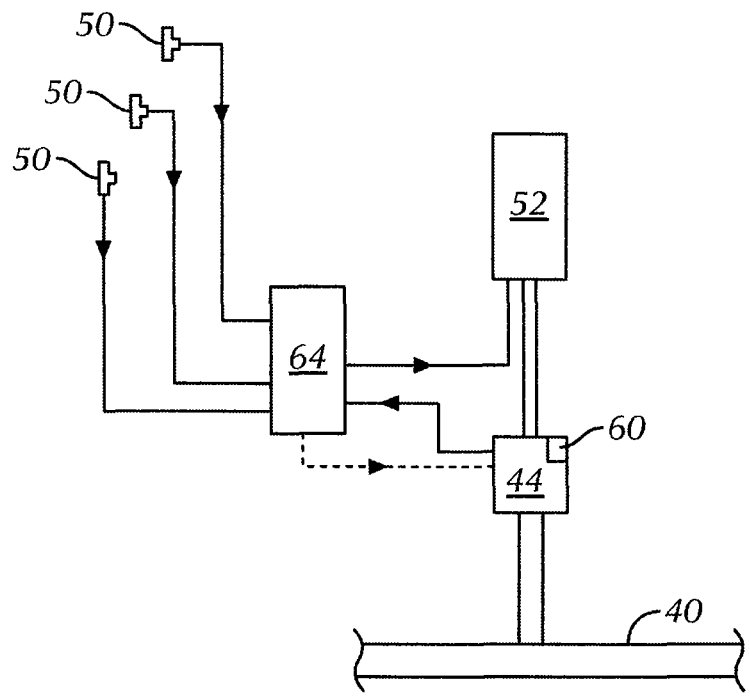
FIG. 4 is a schematic of a portion of a communications network of a combine harvester according to another embodiment of the present invention.

Referring to FIG. 4, a multiplexer 64 may be utilized to inexpensively set up a system to control which images are displayed. Video cameras 50 would be connected to multiplexer 64 in order to transmit images to the multiplexer 64, which would, in turn, be used to select one image for transmission to the graphic display 52 to be displayed. The multiplexer 64 would also be connected to the graphic display control module 44 in order to receive control signals from the graphic display control module 44 to select the desired image for transmission. Such control would be based upon the information from the vehicle data bus 40. While the multiplexer 64 could be connected directly to one video input of the graphic display 52, alternatively, as shown in phantom in FIG. 4, the multiplexer 64 can be connected to the graphic display control module 44 itself to transmit one stream of video images to the graphic display control module 44. In this case, the multiplexer 64 would not be directly connected to the graphic display 52. If the multiplexer 64 is connected to the graphic display control module 44 to transmit image data, the graphic display control module 44 would then transmit this image data to the graphic display 52 for display of images. Alternatively, the multiplexer 64 could be contained within the graphic display 52 or the graphic display control module 44.

Figure 5:
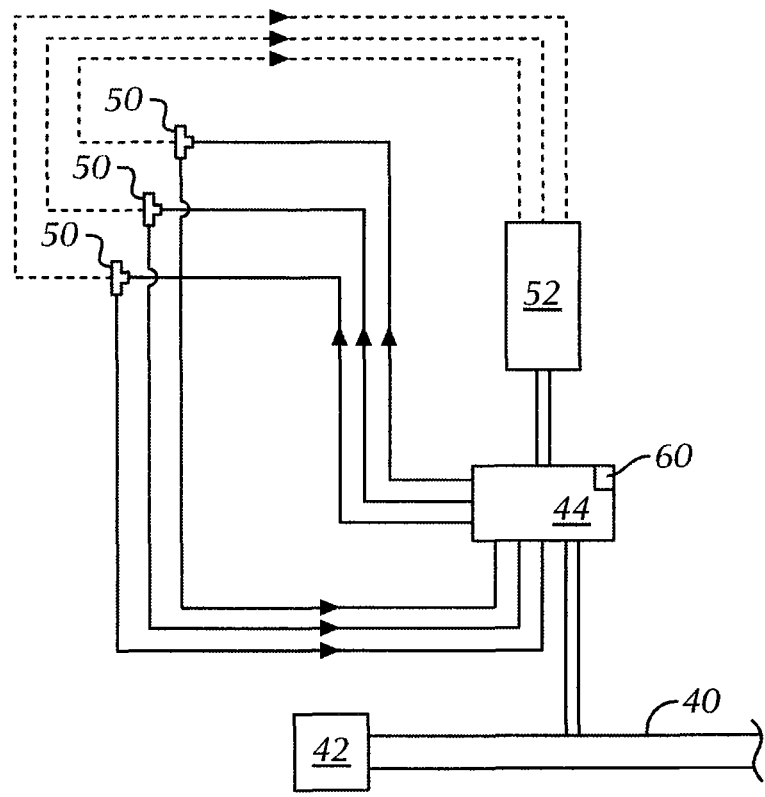
FIG. 5 is a schematic of a portion of a communications network of a combine harvester according to yet another embodiment of the present invention.

In reference to FIG. 5, the video cameras 50 are connected directly to the graphic display control module 44 in order to transmit image data to the graphic display 52 through the graphic display control module 44. Also, the graphic display control module 44 is connected to the video cameras 50 and controls which image data from which of the one or more video cameras 50 are transmitted to the graphic display control module 44 based upon information from the vehicle data bus 40. The image data could also be sent to the graphic display 52 directly from the cameras 50, as shown in phantom.

The present invention is also directed to a method of operating the farm vehicle 10 described above. Information on such operation is included above.

Example 1

1) Structure: A combine harvester includes a video camera 50 facing the discharge end of unloading tube 38. The video camera 50 is directly connected to the graphic display 52. The video camera 50 is always on.

2) Programming: If the unloading tube 38 is activated (e.g. its auger/conveyor is activated, or it is moved to a discharge position), the processor 60 will display the images of the video camera 50 which is facing the unloading tube 38.

3) Steps:

A) Operator presses a switch, enters a command or otherwise signals a desire to activate the unloading tube 38.

B) The electronic operator module 48 detects this event in A) and broadcasts a message on the vehicle data bus 40 indicating that the unloading tube 38 has been activated.

C) The control modules 42 receive the message from B), and the chassis control module 70 responds by turning on the electrical drive to the unloader auger 72 to move grain through the unloading tube 38.

D) The graphic display control module 44 detects the message from B) and responds by sending a signal to the graphic display 52 to display images from the video camera 50 which faces the unloading tube 38.

Example 2

1) Structure: A combine harvester has a video camera 50 facing the sieves 24. The video camera 50 is directly connected to the graphic display 52. The video camera 50 is always on. The light source 62 is an electric light and is off until activated.

2) Programming: If the concave clearance control is activated, the graphic display control module 44 will automatically instruct the graphic display 52 to display the images of the video camera 50 which is facing the sieves 24 and the control module 42 will automatically instruct the light source 62 which illuminates the sieves 24 inside the farm vehicle 10 to turn on. The light source 62 may be on continuously, for a predetermined length of time, or for a variable length of time which corresponds to the display of images of the video camera 50 which is facing the sieves 24 on the graphic display 52.

3) Steps:

A) Operator presses a switch, enters a command or otherwise signals a desire to change the concave clearance to increase it.

B) The electronic operator module 48 detects this event in A) and broadcasts a message on the vehicle data bus 40 indicating that the concave clearance is being changed.

C) The control modules 42 receive the message from B), and the chassis control module 70 responds to it by moving the threshing cylinder 20 and/or the threshing concave 22 away from one another.

D) The graphic display control module 44 detects the message from B) and responds to it by sending a signal to the graphic display 52 to display images from the video camera 50 which faces the sieves 24.

E) A control module 42, based on the message from B), activates the light source 62 for a predetermined amount of time, for a variable length, or until the image from the video camera 50 facing the sieves 24 is no longer displayed on the graphic display 52. For example, the processor 60 can control a switch or relay which supplies electricity to the light source 62 and can activate the light source 62 in synchronization with the video camera's image display.

Example 3

1) Structure: The structure is the same as in Example 2, except that the video camera 50 is connected to the graphic display 52 via the graphic display control module 44.

2) Programming: Same as Example 2, except that the graphic display control module 44 will transmit the images to be displayed by the graphic display 52, rather than instructing the graphic display 52 which images to display.

3) Steps:

A) Same as Example 2.

B) Same as Example 2.

C) Same as Example 2.

D) The graphic display control module 44 detects the message from B) and responds to it by sending to the graphic display 52 image data from the video camera 50 which faces the sieves 24 for display.

E) Same as Example 2.

Example 4

1) Structure: A combine harvester has a video camera 50 facing the sieves 24 and a video camera 50 facing away from the rear of the combine. The video cameras 50 are directly connected to the graphic display 52. The video cameras 50 are always on. The combine harvester has a light source 62 which is an electric light which is off until activated.

2) Programming: If the threshing concave clearance control 46b is activated, the graphic display control module 44 will automatically instruct the graphic display 52 to display the images of the video camera 50 which is facing the sieves 24. If the images from the video camera 50 facing the sieves 24 are to be displayed, a light 62 inside the farm vehicle 10 will be turned on automatically once there is an attempt to change the concave clearance. The light may be on continuously, for a predetermined length of time, or for a variable length of time which corresponds to the camera activation. If the combine farm vehicle 10 is commanded to go in reverse, the graphic display control module 44 will automatically instruct the graphic display 52 to display the images of the rear video camera 50. In the event of commands which would result in the simultaneous display of images from rear video camera 50 and the video camera 50 which faces the sieves 24, the images of rear video camera 50 will be given priority over images from the video camera 50 which is facing the sieves 24.

3) Steps:

A) Operator presses a switch or otherwise signals a desire to change the concave clearance to increase it.

B) The electronic operator module 48 detects events in A) and broadcasts messages on the vehicle data bus 40 indicating that a switch has been manipulated to increase the concave clearance.

C) The control modules 42 (including the chassis control module 70) receive the messages from B) and the chassis control module 70 responds to it by moving the threshing cylinder 20 and/or the threshing concave 22 away from one another D) The graphic display control module 44 detects the messages from B) and responds to them by sending a signal to the graphic display 52 to display the images of the video camera 50 which is facing the sieves 24.

E) A control module 42 also responds to the message from B) by activating the light source 62 for a predetermined amount of time, for a variable length, or until the image from the video camera 50 facing the sieves 24 is no longer displayed on the graphic display 52. For example, the processor 60 can control a switch or relay which supplies electricity to the light source 62 and can activate the light source 62 in synchronization with the video camera's image display.

F) Operator presses a switch (e.g., the propulsion handle 36) or otherwise signals a desire to go in reverse.

G) The electronic operator module 48 detects events in F) and broadcasts messages on the vehicle data bus 40 indicating that a switch has been manipulated to go in reverse.

H) The control modules 42 (including the chassis control module 70) receive the messages from F) and the chassis control module 70 responds to them by moving the farm vehicle 10 in reverse.

I) The graphic display control module 44 detects the messages from G) and responds to them by sending a signal to the graphic display 52 to display the images from the rear camera 50 and not to display the images from the video camera 50 facing the sieves 24. However, if there is room on the graphic display 52 and if desired by the operator, the images from both cameras 50 can be displayed simultaneously.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims

We claim:

1. A farm vehicle including a threshing and cleaning assembly defining part of the internal crop flow path to separate grain material from the harvested crop material, the threshing and cleaning assembly including a threshing cylinder rotatably supported from a frame, a threshing concave positioned proximate to the threshing cylinder to operably interact with the threshing cylinder, one or more sieves, and a fan, comprising:
 a crop gathering mechanism mounted on an end portion of the frame to convey harvested crop material to a crop flow path passing internally through at least part of the vehicle;
 a vehicle data bus;
 a plurality of control modules operatively connected to the vehicle data bus and configured to monitor information on the vehicle data bus and to act according to the information on the vehicle data bus, wherein at least one of the plurality of control modules constitutes a graphic display control module, one or more of the control modules are configured to control at least one function selected from the group consisting of: a rotor speed for the threshing cylinder, a fan speed, a sieve opening size, and a threshing concave clearance, based upon the information from the vehicle data bus;
 a graphic display;
 a plurality of operator controls, the operator controls include at least one control selected from the group consisting of: a rotor speed control, a threshing concave clearance control, a fan speed control, and a sieve opening control;
 an electronic operator module configured to monitor states of the operator controls and to broadcast information on the vehicle data bus specifying the states of the operator controls, the electronic operator module is configured to detect and broadcast information on the vehicle data bus indicative of a change of state of at least one operator control selected from the group consisting of: the rotor speed control, the threshing concave clearance control, the fan speed control, and the sieve opening control;
 a plurality of video cameras positioned within the vehicle to face the crop flow path and being operably connected to the graphic display, each of the plurality of video cameras is assigned to capture a portion of the crop flow path, wherein the change of state of at least one operator control activates one of the plurality of video cameras that is assigned to that portion of the crop flow affected by the at least one operator control;
 the graphic display control module including a processor configured to control the display of images on the graphic display for the selective display of images on the graphic display from one or more of the plurality of video cameras based upon information from the vehicle data bus, the processor is configured to select images for display on the graphic display from one of the plurality of video cameras; and
 the processor selects a video camera from among a plurality of available video cameras that based on action of an operator have become simultaneously available for display of a live video for operator feedback, the processor with commands that arbitrate among the plurality of images from the available video cameras that are simultaneously available for display to the operator.

2. The farm vehicle according to claim 1, wherein the threshing and cleaning assembly comprises one or more light sources positioned to provide illumination to at least a portion of the crop flow path to permit visual detection of the grain material by one or more of the plurality of video cameras, and wherein one or more of the control modules are configured to control an activation of the one or more light sources.

3. The farm vehicle according to claim 2, wherein: one or more of the control modules are configured to temporarily activate the light source in response to the information from the vehicle data bus indicative of the change of state of the at least one operator control selected from the group consisting of: the rotor speed control, the threshing concave clearance control, the fan speed control, and the sieve opening control.

4. The farm vehicle according to claim 3, wherein the processor is configured to prioritize, select, and exclude images from the video cameras for display by the graphic display based upon a predetermined command.

5. The farm vehicle according to claim 4, further comprising:
 a propulsion handle coupled with the data bus; and a rear camera coupled with the data bus and facing away from a back portion of the farm vehicle, and wherein the processor is configured to prioritize and select a display of images from the rear camera on the graphic display in response to information on the vehicle data bus indicative of a reverse movement direction of the farm vehicle.

6. The farm vehicle according to claim 1, wherein the one or more control modules comprise an engine control module configured to broadcast engine speed information to the vehicle data bus, and wherein the graphic display is configured to display engine speed based on the engine speed information.

7. The farm vehicle according to claim 1, wherein the video cameras are directly connected to the graphic display to communicate with the graphic display.

8. A farm vehicle, comprising:
a frame;
a crop gathering mechanism mounted on an end portion of the frame to convey harvested crop material to a crop flow path passing internally through at least part of the vehicle;
a vehicle data bus;
a plurality of control modules operatively connected to the vehicle data bus and configured to monitor information on the vehicle data bus and to act according to the information on the vehicle data bus, wherein at least one of the plurality of control modules constitutes a graphic display control module;
a graphic display operatively connected to the graphic display control module;
a plurality of operator controls;
an electronic operator module configured to monitor states of the operator controls and to broadcast information on the vehicle data bus specifying the states of the operator controls; and a plurality of video cameras positioned within the vehicle to face the crop flow path and being operably connected to the graphic display, wherein the graphic display control module is configured to select one of the plurality of video cameras for the display of video images on the graphic display based upon information from the vehicle data bus; and
a processor that arbitrates for selection of a video camera from a plurality of video cameras that are simultaneously available for display of a live image to an operator, a plurality of live images become simultaneously available for display to the operator based on an action of the operator.

9. A farm vehicle, comprising:
a frame;
a crop gathering mechanism mounted on an end portion of the frame to convey harvested crop material to a crop flow path passing internally through at least part of the vehicle;
a vehicle data bus;
a plurality of control modules operatively connected to the vehicle data bus and configured to monitor information on the vehicle data bus and to act according to the information on the vehicle data bus, wherein at least one of the plurality of control modules constitutes a graphic display control module;
a graphic display operatively connected to the graphic display control module;
a plurality of operator controls;
an electronic operator module configured to monitor states of the operator controls and to broadcast information on the vehicle data bus specifying the states of the operator controls; and
a plurality of video cameras positioned within the vehicle to face the crop flow path and being operably connected to the graphic display, wherein the graphic display control module is configured to activate one of the plurality of video cameras based upon information from the vehicle data bus, and
a processor having commands to arbitrate about selection of a video camera that supplies a live video for operator feedback, from a plurality of video cameras that are simultaneously available for display to an operator, the plurality of video cameras become simultaneously available for display to the operator based on an action of the operator.

* * * * *